US006772630B2

(12) United States Patent
Araya

(10) Patent No.: US 6,772,630 B2
(45) Date of Patent: Aug. 10, 2004

(54) MICRO-DISTANCE TOSS-UP TYPE ABSOLUTE GRAVIMETER

(75) Inventor: Akito Araya, Matsudo (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 10/165,278

(22) Filed: Jun. 10, 2002

(65) Prior Publication Data

US 2003/0136190 A1 Jul. 24, 2003

(30) Foreign Application Priority Data

Jan. 21, 2002 (JP) ........................................ 2002-011961

(51) Int. Cl.[7] .............................................. G01V 7/14
(52) U.S. Cl. ................................................... 73/382 R
(58) Field of Search ......................... 73/382 R, 382 G; 356/450; 359/529, 629

(56) References Cited

PUBLICATIONS

T.M. Niebauer, et al. "A New Generation of Absolute Gravimeters," Metrologia, vol. 32, 1995, pp. 159–180.
M. J. Downs, et al. "An Unmodulated Bi–Directional Fringe–Counting Interferometer System for Measuring Displacement," Precision Engineering, 1979, pp. 85–88.
A. Sakuma "Present State of a New Absolute Determination of Gravity at BIPM," Bulletin Geodesigne, vol. 69, 1963, pp. 249–260.

Primary Examiner—John E. Chapman
(74) Attorney, Agent, or Firm—Oblon, Spivak, McClelland, Maier & Neustadt, P.C.

(57) ABSTRACT

A micro-distance toss-up type absolute gravimeter comprises a vacuum container mounted on the ground, a reference mirror supported in the vacuum container, a drop mirror to be dropped within the vacuum container, a toss-up device that tosses up the drop mirror by a constant distance, an atomic clock that can define time with a high precision, an interferometer that measures the position of the drop mirror in time series, and can acquire an interference waveform, and an operation unit that calculates gravitational acceleration based on the interference waveform obtained by the interferometer and the time defined by the atomic clock.

9 Claims, 2 Drawing Sheets

MICRO-DISTANCE TOSS-UP TYPE ABSOLUTE GRAVIMETER

CROSS-REFERENCE TO RELATED APPLICATIONS

This application is based upon and claims the benefit of priority from the prior Japanese Patent Application No. 2002-011961, filed Jan. 21, 2002, the entire contents of which are incorporated herein by reference.

BACKGROUND OF THE INVENTION

1. Field of the Invention

The present invention relates to a gravimeter for measuring gravitational acceleration, particularly to an absolute gravimeter for measuring the gravity at a specific place.

2. Description of the Related Art

A gravimeter has been used to estimate the rise or drop of the ground, changes of materials in the earth, and also the nature of soil from a gravity distribution, from changes of gravitational acceleration, for example, in the field of geophysics.

Gravimeters are basically classified into absolute gravimeters and relative gravimeters. An absolute gravimeter measures the absolute value of gravitational acceleration ($9.79 \ldots$ m/s$^2$) with a precision of eight to nine figures.

On the other hand, a relative gravimeter measures the gravity difference between two measurement points, or changes in gravity over time at one measurement point, and a LaCoste gravimeter is well known. A relative gravity meter is generally small-sized, and is superior in mobility, but cannot be used in observing a long-period fluctuation because of the drift of a spring. Therefore, a relative gravitational difference with respect to a certain gravitational reference point is measured, and then the absolute value is estimated. However, even in this case, schemes such as reciprocating measurement in a short time are required for correcting the drift.

At present, only the FG5 absolute gravimeter, manufactured by Micro-g Solutions Co., U.S.A., is available on the market. In the FG5 absolute gravimeter, a drop mirror is raised by a mechanical elevator, and then simply dropped. The relation between the current position of the drop mirror and an elapsed time is obtained, to obtain the gravitational acceleration value. An interferometer disposed between a reference mirror supported by the spring and the drop mirror is used to count interference fringes, and the position of the drop mirror is measured.

Since the FG5 absolute gravimeter counts the interference fringes to specify the position of the drop mirror, position data of the drop mirror have a poor position resolution of a half wavelength. The drop distance, therefore, is set long to about 20 cm in order to obtain a sufficient number of data. Therefore, the apparatus is large. Moreover, it is necessary to correct contribution of gravity gradient depending on the vertical position with respect to an obtained gravity value. Furthermore, since an optical path difference between a light beam passed via the reference mirror and a light beam passed via the drop mirror is large, it is also necessary to correct the frequency fluctuation error of the laser beam source.

It requires about ten seconds at minimum to raise the drop mirror by the mechanical elevator, and therefore the apparatus is unsuitable for continuous measurement. Moreover, the mechanical operation in vacuum has a low reliability.

Additionally, it is necessary to correct several system errors regarding vacuum pressure, speed of light, and the like. That is, since the drop mirror moves in only one direction, it is necessary to correct the resistance of molecules of air, and the like remaining in a chamber, or the influence of the relative speed of light (influence exerted because the speed of the light has a finite value).

The reference mirror is supported by the spring and is hardly influenced by high-frequency ground vibration, but the influence of low-frequency ground vibration cannot be avoided, and the resolution is actually determined by the vibration inherent in the spring excited by the low-frequency ground vibration.

Absolute gravity measurement is important for observing or forecasting earthquakes or volcanic activity. However, a conventional absolute gravimeter has a very large size, and lacks the mobility required for outdoor observation. Moreover, since apparatuses are very expensive, the apparatuses have not been installed in a large number of locations for emergencies such as a volcanic eruption under existing circumstances.

BRIEF SUMMARY OF THE INVENTION

The present invention has been developed in consideration of the above-described circumstances, and a main object thereof is to provide a small-sized and inexpensive absolute gravimeter.

According to an aspect of the present invention, there is provided a micro-distance toss-up type absolute gravimeter comprising: a vacuum container mounted on the ground; a reference mirror supported in the vacuum container; a drop mirror to be dropped within the vacuum container; a toss-up device which tosses up the drop mirror by a constant distance; an atomic clock which can define time with a high precision; an interferometer which measures the position of the drop mirror in time series, and can acquire an interference waveform; and an operation unit which calculates gravitational acceleration based on the interference waveform obtained by the interferometer and the time defined by the atomic clock.

According to another aspect of the present invention, there is provided a micro-distance toss-up type absolute gravimeter comprising: a vacuum container mounted on the ground; a reference mirror supported in the vacuum container; a drop mirror to be dropped within the vacuum container; a toss-up device which tosses up the drop mirror by a constant distance; an atomic clock which can define time with a high precision; an interferometer which measures the position of the drop mirror in time series; a support mechanism to support the reference mirror in such a manner that the reference mirror can be displaced in a direction vertical to the ground; a driving mechanism which vibrates the reference mirror in the same phase as that of the ground; and an operation unit which calculates temporary gravitational acceleration based on information from the interferometer and the atomic clock, subtracts an acceleration of vibration of the ground obtained based on a driving signal of the driving mechanism from the calculated temporary gravitational acceleration, and calculates the gravitational acceleration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
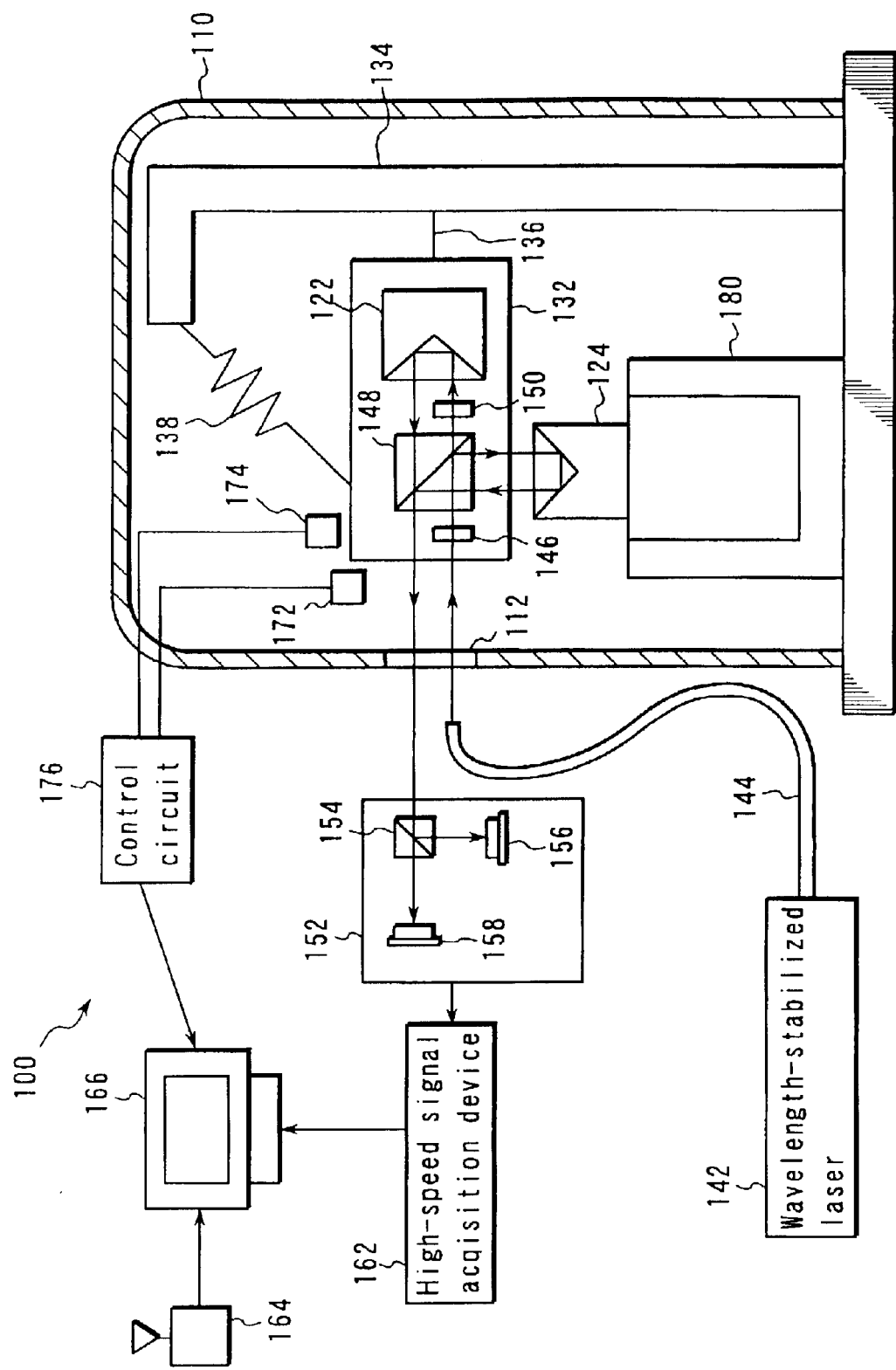
FIG. 1 shows one embodiment of a micro-distance toss-up type absolute gravimeter according to the present invention.

An embodiment of a micro-distance toss-up type absolute gravimeter according to the present invention is shown in FIG. 1.

As shown in FIG. 1, a micro-distance toss-up type absolute gravimeter 100 comprises: a vacuum container 110 mounted on the ground; a reference mirror 122 supported in the vacuum container; a drop mirror 124 to be dropped within the vacuum container; a toss-up device 180 for tossing up the drop mirror 124 by a constant distance; an atomic clock 164 which can define time or measure a period of time with a high precision; an interferometer for measuring the position of the drop mirror 124 in time series, the interferometer being able to acquire an interference waveform; and an operation unit 166 for calculating gravitational acceleration based on the interference waveform obtained by the interferometer, and the defined time or the measured time by the atomic clock 164.

The reference mirror 122 and drop mirror 124 are both reflectors for returning an incident beam in an opposite parallel direction. The reference mirror 122 and drop mirror 124 comprise corner reflectors, for example.

Here, the atomic clock 164 is a clock that can define the time or measure the period of time with a precision to eight decimal places or more. The atomic clock 164 is a high-precision clock using an atomic frequency standard, such as a generally known atomic clock in which cesium is used, but may be a GPS clock which can acquire time information or period of time information from a satellite.

The interferometer includes a light source unit for emitting a light beam, which comprises a light source 142 for generating a light, and an optical fiber 144 for guiding the generated light. The light source 142 preferably comprises a single-wavelength laser, more preferably a wavelength-stabilized laser. The light source 142 emits, for example, visible light or near infrared light, in other words, light having a wavelength of 400 nm to 1 $\mu$m.

The interferometer further includes: a non-polarized beam splitter 148 for splitting the light beam emitted from the optical fiber 144 into a first light beam directed to the reference mirror 122 and a second light beam directed to the drop mirror 124, and for recombining the first light beam passed via the reference mirror 122 with the second light beam passed via the drop mirror 124 to produce an interference light beam; a photodetector 152 for detecting the recombined light beam; and a high-speed signal acquisition device 162 for sampling the signal output from the photodetector 152 at a high speed and acquiring an interference waveform.

Furthermore, the interferometer can acquire two types of interference waveforms different from each other in phase in order to detect the movement direction of the drop mirror 124. Therefore, the interferometer includes: a retardation plate disposed on an optical path between the optical fiber 144 and the non-polarized beam splitter 148, such as a half-wave plate 146; and another retardation plate disposed on the optical path between the non-polarized beam splitter 148 and the reference mirror 122, such as a quarter-wave plate 150.

The half-wave plate 146 gives two types of polarization components to the light beam incident upon the non-polarized beam splitter 148, and the quarter-wave plate 150 gives a phase difference of $\pi/2$ to two types of polarization components passing through the plate 150. The position of the half-wave plate 146 is not limited to that between the optical fiber 144 and the non-polarized beam splitter 148, and may also be disposed in an arbitrary position on the optical path between the light source 142 and the non-polarized beam splitter 148.

When the light emitted from the optical fiber 144 is p-polarized light, the half-wave plate 146 rotates the polarized plane of the p-polarized light incident upon the plate by 45 degrees, and converts the light to light containing equal amounts of p-polarized and s-polarized light. The quarter-wave plate 150 gives a phase difference of $\pi/2$ between the p-polarized light and the s-polarized light.

In order to independently detect the two types of polarized light, the photodetector 152 includes: a polarized beam splitter 154 for splitting the light beam into a first polarized light beam and second polarized light beam; a first photodetector 156 for detecting the first polarized light (e.g., the s-polarized light); and a second photodetector 158 for detecting the second polarized light (e.g., the p-polarized light).

The high-speed signal acquisition device 162 independently samples the signal output from the first photodetector 156 and the signal output from the second photodetector 158 at high speed, and can thereby acquire the interference waveform of the first polarized light (e.g., the s-polarized light) and the interference waveform of the second polarized light (e.g., the p-polarized light). The high-speed signal acquisition device 162 comprises, for example, an A/D converter, which may have a sampling frequency of 1 MHz or more.

The operation unit 166 calculates the movement direction and position of the drop mirror 124 in each time defined by the GPS clock, that is, the atomic clock 164, based on two interference waveforms obtained by the high-speed signal acquisition device 162 and having different phases, such as the interference waveform of the first polarized light (e.g., the s-polarized light) and the interference waveform of the second polarized light (e.g., the p-polarized light) which deviate from each other in phase by $\pi/2$. For example, the operation unit 166 calculates phase information including the direction, fitting the interference waveforms with sine and cosine functions as theoretical curves.

The reference mirror 122 is contained together with the half-wave plate 146, non-polarized beam splitter 148, and quarter-wave plate 150 in one unit (reference mirror unit) 132. The reference mirror 122, half-wave 146, non-polarized beam splitter 148, and quarter-wave plate 150 are all fixed to the unit 132, and these relative positions are kept to be constant.

The absolute gravimeter 100 further comprises: a support mechanism for supporting the reference mirror unit 132 so that the unit can be displaced in a direction vertical to the ground; and a driving mechanism for vibrating the reference mirror unit 132 in the same phase as that of the ground.

The support mechanism includes: a pillar 134 vertically disposed in the vacuum container 110; an elastic lever 136 for supporting the reference mirror unit 132 like a cantilever; and a vibration damping mechanism for preventing a high-frequency vibration of the ground from being transmitted to the reference mirror unit 132, that is, a so-called damper 138. The support of the reference mirror unit 132 is not limited to the cantilever, and the unit may be supported by a both ends support or another arbitrary support. The vibration damping mechanism 138 damps the vibration having a high frequency, for example, of 25 Hz or more. The vibration damping mechanism 138 comprises, for example, a spring, but is not limited to a spring, and may alternatively comprise another mechanism or member.

The driving mechanism includes: a position sensor 172 for detecting the position of the reference mirror unit 132 in the direction vertical to the ground; a control force applying unit 174 for displacing the reference mirror unit 132 in the direction vertical to the ground; and a control circuit 176 for controlling the control force applying unit 174 so that position information of the reference mirror unit 132 obtained by the position sensor 172 is maintained to be constant. The position of the reference mirror unit 132 in the direction vertical to the ground is vibrated in the same phase as that of the ground by feedback.

The position sensor 172 comprises, for example, an optical position detector including a semiconductor laser and two-split photodiode, but is not limited to this, and may alternately comprise another type of sensor. The control force applying unit 174 comprises, for example, an actuator using a solenoid, but is not limited to this, and may alternately comprise another actuator.

The reference mirror unit 132, drop mirror 124, toss-up device 180, support mechanism (i.e., the pillar 134, elastic lever 136, and vibration damping mechanism 138), position sensor 172, and control force applying unit 174 are all disposed in the vacuum container 110. The light source unit (i.e., the wavelength-stabilized laser 142 and optical fiber 144), photodetector 152, high-speed signal acquisition device 162, atomic clock 164, and operation unit 166 are disposed outside the vacuum container 110. The half-wave plate 146 included in the reference mirror unit 132 may be disposed outside the vacuum container 110.

The vacuum container 110 has an optical window 112, which allows light to pass. The light beam from the optical fiber 144 enters the vacuum container 110 through the optical window 112, and the recombined light beam from the non-polarized beam splitter 148, that is, the interference light beam exits the vacuum container via the optical window 112 and reaches the photodetector 152.

Figure 2:
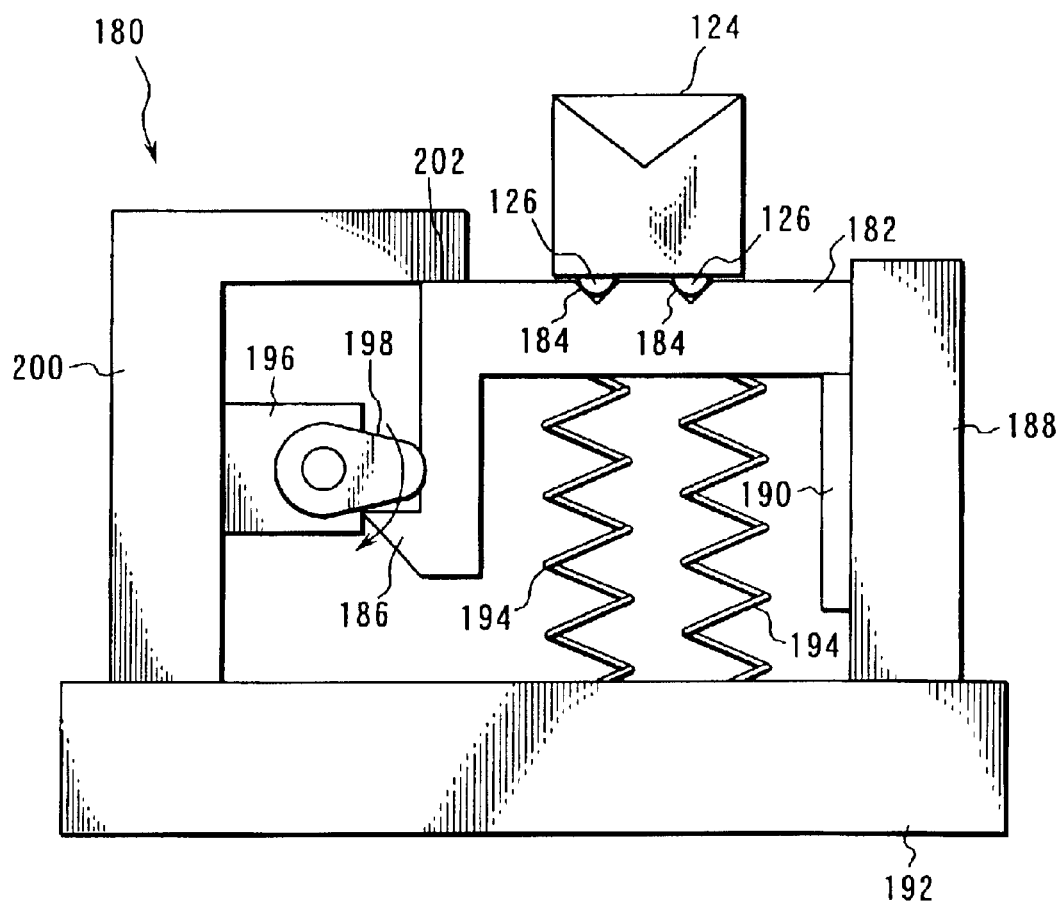
FIG. 2 shows a schematic constitution of a toss-up device shown in FIG. 1.

As shown in FIG. 2, the toss-up device 180 includes: a toss-up base 182 on which the drop mirror 124 is laid; a support mechanism for supporting the toss-up base 182 so that the base moves in a vertical direction; a spring 194 for pushing the toss-up base 182; a cam mechanism for compressing the spring 194; and a stopper 200 for preventing the toss-up base 182 from moving upwards.

The toss-up base 182 has several V grooves for receiving round feet 126 attached to the drop mirror 124. The support mechanism includes a base 192, a pillar 188 vertically mounted on the base, and a guide 190 attached to the pillar. The cam mechanism includes a lug 186 provided with the toss-up base 182, a cam 198 which meshes with the lug, and a motor 196 for rotating the cam 198.

The cam 198 is rotated by the motor 196, and pushes downwards the lug 186 of the toss-up base 182. Thereby, the toss-up base 182 moves downwards along the guide 190 so that the spring 194 is compressed.

When the cam 198 is further rotated, the cam 198 is detached from the lug 186, and the toss-up base 182 is pushed upwards by the restoring force of the spring 194. The toss-up base 182 bumps against an end 202 of the stopper 200 and stops. The drop mirror 124 laid on the toss-up base 182 is tossed upwards.

Since the spring 194 is stably compressed by the cam mechanism by the same amount each time, the toss-up base 182 can toss up the drop mirror 124 by a constant distance, for example, of about 2 mm with good reproducibility. Furthermore, for example, when the cam 198 is rotated at a constant speed, the toss-up base 182 can continuously toss up the drop mirror 124.

In FIG. 1, the drop mirror 124 is tossed up by the toss-up device 180 by a distance of about 2 mm. While the drop mirror 124 is tossed up, in other words, while the drop mirror freely falls, the position of the drop mirror 124 is measured by the interferometer in time series.

As described above, the interference waveforms of two kinds of polarized light, which have $\pi/2$ different phase, are obtained with the high-speed signal acquisition device 162 by the high-speed sampling. The operation unit 166 calculates the movement direction and position of the drop mirror 124 based on these two interference waveforms. The position of the drop mirror 124 is obtained with high precision by analyzing the interference waveforms.

Furthermore, the operation unit 166 temporarily calculates gravitational acceleration based on the time defined by the atomic clock, that is, the GPS clock 164, and the movement direction and position of the drop mirror 124 in each time obtained from the interference waveform.

Moreover, as described above, a feedback control system comprising the position sensor 172, control force applying unit 174, and control circuit 176 vibrates the reference mirror unit 132 in the same phase as that of the ground. In the feedback control system, the driving signal supplied to the control force applying unit 174 from the control circuit 176 corresponds to the acceleration of the vibration of the ground. That is, the driving signal indicates the acceleration of the vibration of the ground.

The operation unit 166 subtracts the acceleration of the vibration of the ground from the temporary gravitational acceleration calculated beforehand, and calculates the gravitational acceleration.

As seen from the above description, since the absolute gravimeter 100 of the present embodiment analyzes the interference waveforms to obtain the position of the drop mirror 124, the toss-up distance can be set to a short distance of about 2 mm. Thereby, the apparatus constitution is miniaturized.

Since the toss-up distance is short, the influences of the gravity gradient and frequency fluctuation of the light source 142 can be substantially ignored. That is, it is unnecessary to correct the influence of the gravity gradient or the influence of frequency fluctuation of the light source 142. Thereby, the correction of an error factor is simplified.

Since the absolute gravimeter 100 is of a toss-up type, not of a simple drop type, system errors of vacuum degree and light speed are removed. That is, the air resistance caused by a slight amount of gas remaining in the vacuum container, or the influence created by the difference in the advancing direction of light with respect to the drop mirror is offset during rising and falling. Thereby, the vacuum system is simplified, and correction of the error factors can also be simplified.

Since the toss-up distance is short, the toss-up device 180 can continuously toss up the drop mirror 124 substantially without generation of vibration. Therefore, the absolute gravimeter 100 is preferable for continuous measurement.

Therefore, the micro-distance toss-up type absolute gravimeter 100 of the present embodiment can be inexpensively manufactured in a small size while a high measurement precision is maintained.

The absolute gravimeter 100 of the present embodiment is inexpensive, and can therefore be installed in a large number of locations in emergencies such as volcanic eruptions. Moreover, the meter is small-sized and can therefore be easily installed. Thereby, it is possible to measure the gravitational acceleration of a dangerous zone in the vicinity of a volcano in a safe remote area.

In the present embodiment, vibration of the ground having a relatively high frequency of 25 Hz or more is cut by the vibration damping mechanism, and vibration of the ground having a relatively low frequency of 25 Hz or less is cut by numeric value calculation. However, vibration of the ground having a relatively high frequency of 25 Hz or more may also be cut by a numeric value calculation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A micro-distance toss-up type absolute gravimeter comprising:

a vacuum container mounted on the ground;

a reference mirror supported in the vacuum container;

a drop mirror to be dropped within the vacuum container;

a toss-up device that tosses up the drop mirror by a constant distance;

an atomic clock that can define time with a high precision;

an interferometer that measures the position of the drop mirror in time series, and can acquire an interference waveform; and an operation unit that calculates gravitational acceleration based on the interference waveform obtained by the interferometer and the time defined by the atomic clock.

2. The micro-distance toss-up type absolute gravimeter according to claim 1, wherein the interferometer includes: a light source unit that emits a light beam; a non-polarized beam splitter that splits the light beam from the light source into a first light beam directed to the reference mirror and a second light beam directed to the drop mirror, and recombines the first light beam passed via the reference mirror and the second light beam passed via the drop mirror to produce an interference light beam; a photodetector that detects the recombined light; and a high-speed signal acquisition device that samples an output signal of the photodetector at a high speed and acquires the interference waveform, and the interferometer further includes: a first retardation plate that gives two types of polarization components to the light beam incident upon the non-polarized beam splitter; and a second retardation plate that gives a phase difference between two types of polarized light, and the photodetector includes: a polarized beam splitter that splits the light beam into a first polarized light beam and a second polarized light beam; a first photodetector that detects the first polarized light beam; and a second photodetector that detects the second polarized light beam.

3. The micro-distance toss-up type absolute gravimeter according to claim 2, further comprising:

a support mechanism to support the reference mirror so that the reference mirror can be displaced in a direction vertical to the ground; and a driving mechanism that vibrates the reference mirror in the same phase as a phase of the ground;

wherein the operation unit subtracts an acceleration of vibration of the ground obtained based on a driving signal of the driving mechanism from the gravitational acceleration calculated from the interference waveform.

4. The micro-distance toss-up type absolute gravimeter according to claim 3, wherein the driving mechanism includes:

a control force applying unit that displaces the reference mirror in the direction vertical to the ground;

a position sensor that detects the position of the reference mirror; and a control circuit that controls the control force applying unit in order to maintain position information of the reference mirror obtained by the position sensor to be constant.

5. The micro-distance toss-up type absolute gravimeter according to claim 3, wherein the support mechanism includes:

a unit including the reference mirror;

an elastic lever that supports the unit in a cantilever manner; and a vibration damping mechanism that damps transmission of a high-frequency vibration of the ground.

6. The micro-distance toss-up type absolute gravimeter according to claim 4, wherein the reference mirror, the drop mirror, the toss-up device, the support mechanism, the non-polarized beam splitter, the second retardation plate, the control force applying unit, and the position sensor are all disposed in the vacuum container, and the light source, the photodetector, the high-speed signal acquisition device, and the operation unit are disposed outside the vacuum container, the vacuum container includes an optical window that allows light to pass therethrough, such that the light beam from the light source unit enters the vacuum container through the optical window, and the recombined light beam exits the vacuum container through the optical window.

7. A micro-distance toss-up type absolute gravimeter comprising:

a vacuum container mounted on the ground;

a reference mirror supported in the vacuum container;

a drop mirror to be dropped within the vacuum container;

a toss-up device that tosses up the drop mirror by a constant distance;

an atomic clock that can define time with a high precision;

an interferometer that measures the position of the drop mirror in time series;

a support mechanism to support the reference mirror so that the reference mirror can be displaced in a direction vertical to the ground;

a driving mechanism that vibrates the reference mirror in the same phase as a phase of the ground; and an operation unit that calculates temporary gravitational acceleration based on information from the interferometer and the atomic clock, subtracts an acceleration of vibration of the ground obtained based on a driving signal of the driving mechanism from the calculated temporary gravitational acceleration, and calculates the gravitational acceleration.

8. The micro-distance toss-up type absolute gravimeter according to claim 7, wherein the driving mechanism includes:

a control force applying unit that displaces the reference mirror in the direction vertical to the ground;

a position sensor that detects the position of the reference mirror; and a control circuit that controls the control force applying unit in order to maintain position information of the reference mirror obtained by the position sensor to be constant.

9. The micro-distance toss-up type absolute gravimeter according to claim 7, wherein the support mechanism includes:

a unit including the reference mirror;

an elastic lever that supports the unit in a cantilever manner; and a vibration damping mechanism that damps transmission of a high-frequency vibration of the ground.

* * * * *